June 5, 1956  L. A. STANFIELD  2,749,204
DUAL RANGE RECORDING INSTRUMENT
Filed April 6, 1953  3 Sheets-Sheet 1

LEROY A. STANFIELD
INVENTOR.

BY Lyon & Lyon
ATTORNEYS

LEROY A. STANFIELD
INVENTOR.

LEROY A. STANFIELD
INVENTOR.

BY Lyon & Lyon

ATTORNEYS

United States Patent Office 2,749,204
Patented June 5, 1956

2,749,204

DUAL RANGE RECORDING INSTRUMENT

Leroy A. Stanfield, Los Angeles, Calif.

Application April 6, 1953, Serial No. 346,995

8 Claims. (Cl. 346—35)

This invention relates to recording instruments and is particularly directed to improvements in recording devices having a plurality of pen arms operating simultaneously upon the same chart. The pen arms are moved by members sensitive to conditions to be controlled and the motion of one arm is proportional or related to that of another arm.

My invention will be described in connection with apparatus for providing a record of pressure variations within a conduit. One of the pen arms is accurate in the low range of the instrument but may swing completely off scale in the high range. Another pen arm is accurate in the high range but moves through such a small distance in the low range as to make accurate reading difficult to obtain.

As a specific example, the dual range recording instrument embodying my invention may be used advantageously in connection with gas flow measuring devices employing orifice plates. Heavy flows of gas under pressure in pipe lines are often measured by measuring the difference in pressure on the upstream and downstream sides of an orifice plate having known flow characteristics. Heavy rates of flow are reflected in a relatively high pressure differential across the orifice plate and similarly low rates of flow are indicated by a relatively small pressure differential. A continuous record is customarily made of the pressure changes in a twenty-four hour period and this record may be used for calculating the amount and therefore the price of the gas delivered.

It has been found that single pen arm recording chart instruments are capable of producing an accurate record for either high rates of flow or low rates of flow but not both.

It has heretofore been proposed to extend the range of a conventional recording instrument by employing two pen arms which are simultaneously operable and which move proportionately but at different rates. Thus if a first arm moves at five times the rate of a second arm, the first arm will produce a satisfactory record for low rates of flow while the second arm will produce a satisfactory record for high rates of flow. A serious difficulty is encountered, however, in that both pen arms must register zero when the gas flow ceases. This produces interfering contact of the pen tips since both pen arms swing from the same axis and since both must be of the same length in order to "track" on the chart calibrations.

It is the principal object of my invention to provide novel means for eliminating this interfering contact on recording instruments having a plurality of simultaneously operable pen arms. Another object is to provide means for changing the rate of movement of one of the arms when the tip thereof is approached by the tip of the other arm. Another object is to provide means for increasing the rate of movement of one of the arms when the tip reaches a pre-determined location relative to the scale of the chart. A more particular object is to provide a novel form of connection between a force applying element and a crank which is fixed relative to one of the pen arms. Another object is to provide an attachment for converting a conventional single pen recording instrument to a dual range instrument having two pen arms which are operable simultaneously. Other related objects and advantages will appear hereinafter.

Referring to the drawings.

In the drawings.

Figure 1:
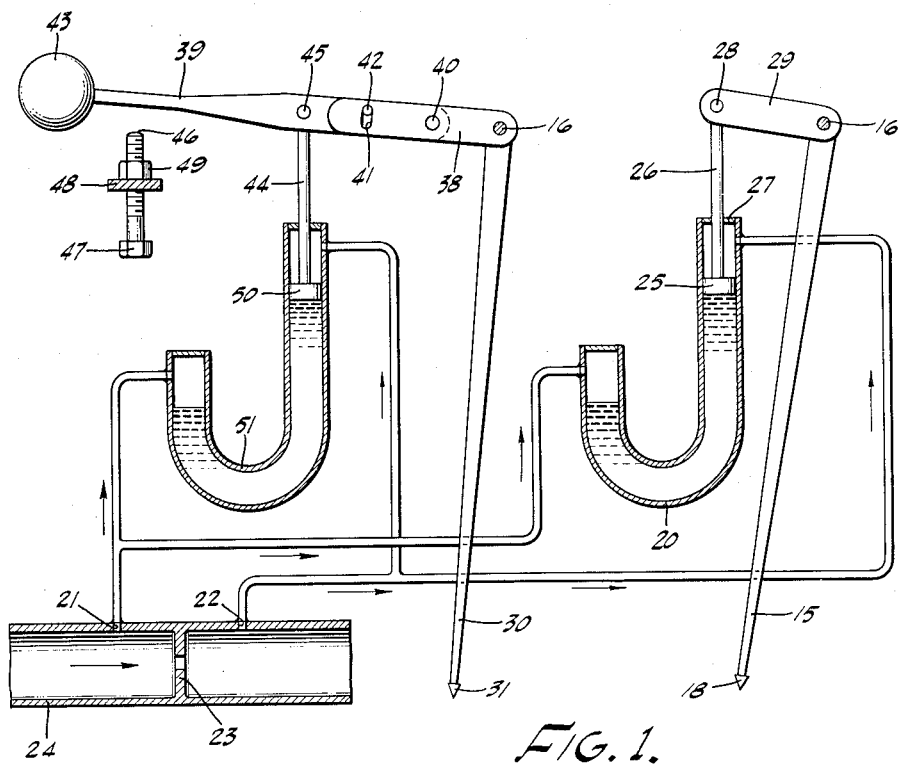
Figure 1 is a diagrammatic view showing one embodiment of my invention in schematic form.

The recording instrument generally designated 10 may include a case or housing 11 having a hinged cover 12. A paper chart 13 of conventional type is detachably secured to a rotary element 14 which is driven by means of a clock motor or other device, not shown, located within the housing 11. A first pen arm 15 is fixed to a rotary shaft 16 which projects through a support 17. Turning of the shaft 16 causes the tip 18 of the pen arm 15 to swing in an arc about the axis of the shaft 16. The chart 13 is calibrated with arcuate lines 19 which coincide with the arc described by the pen tip 18.

Recording instruments of this type having a rotary chart are commonly used for providing a record of changes in temperature, pressure, or any other variable which it is desired to measure. The device may be used for measuring pressure differentials and as shown diagrammatically in Figure 1, a manometer 20 may be connected to ports 21 and 22 located upstream and downstream of an orifice plate 23 mounted in a pipe line 24. The flow of gas through the pipe line at any given temperature may be measured by means of the pressure drop across the orifice plate 23. Accordingly one leg of the manometer 20 is connected to the upstream port 21 and the other leg to the downstream port 22. The difference in level of the liquid in the two legs provides a measure of the pressure drop across the orifice plate. A float 25 in one leg of the manometer may be connected to an actuating rod 26 which extends through a seal 27. The rod is pivotally connected at 28 to a crank 29 fixed to the shaft 16. From this description it will be understood that swinging movement of the pen tip 18 is caused by variations in the rate of flow of gas through the pipe line 24.

Figure 2:
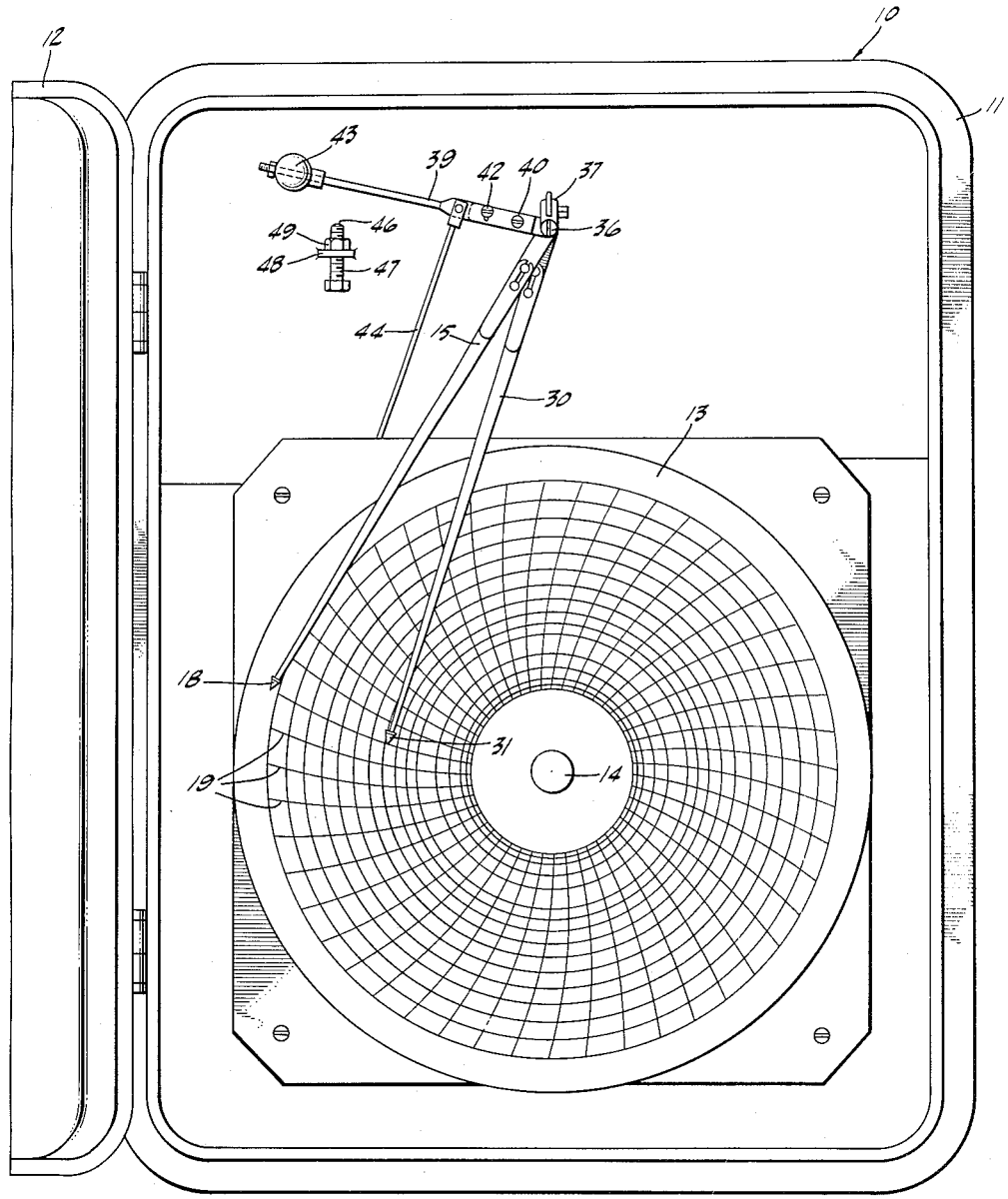
Figure 2 is a front elevation showing a preferred embodiment of my invention.

Charts of the type shown in Figure 2 may be used as a basis for charging a customer for gas used over a twenty-four hour period and therefore the ink trace made by the tip 18 must be as accurate as possible. It has been found, however, that if the linkage is chosen to provide adequate sweep of the tip 18 for very low rates of flow of gas, that the tip 18 moves completely off the calibrated portion of the chart 13 for high rates of flow.

Figure 5:
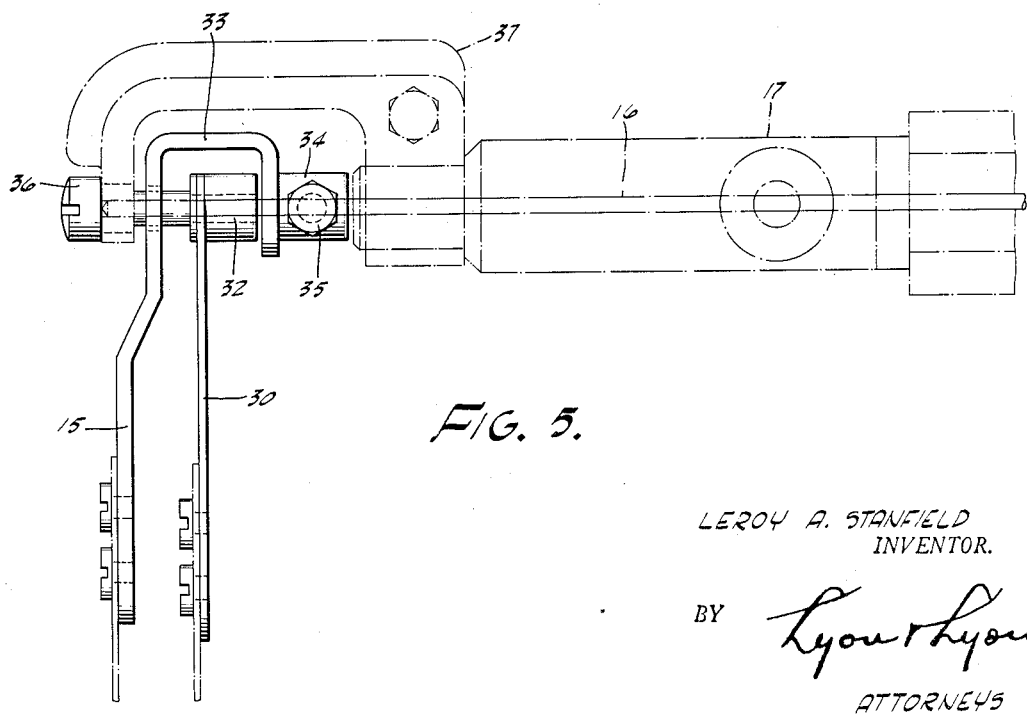
Figure 5 is a side elevation showing the two pen arms and supporting parts.

In accordance with my invention, I provide a second pen arm 30 which is pivotally mounted for movement about an axis of the shaft 16 and which is exactly the same length as the first pen arm 15. The tip 31 of the arm 30 describes exactly the same arcuate path as the tip 18, but moves proportionately at a lower rate. For clarity of illustration in Figure 1 I have shown the two arms 15 and 30 in side by side relationship whereas in actual practice they extend from the same pivotal axis, that is, the axis of the shaft 16. The arm 30 is fixed to a bushing 32 which rotates freely on the shaft 16. In the particular construction illustrated in Figure 5, the arm 15 is provided with a U-shaped bracket 33 at its upper end and this bracket is fixed to the bushing 34. A set screw 35 connects the bushing 34 to the shaft 16. The crank 29 is fixed to that portion of the shaft 16 which projects from the right-hand end of the support 17, as shown in Figure 5. The threaded sleeve 36 provides a rotary bearing for the forward end of the shaft 16. The bracket 37 which is fixed to the support 17 serves as a mounting for the outboard bearing provided by the sleeve 36.

Figure 6:
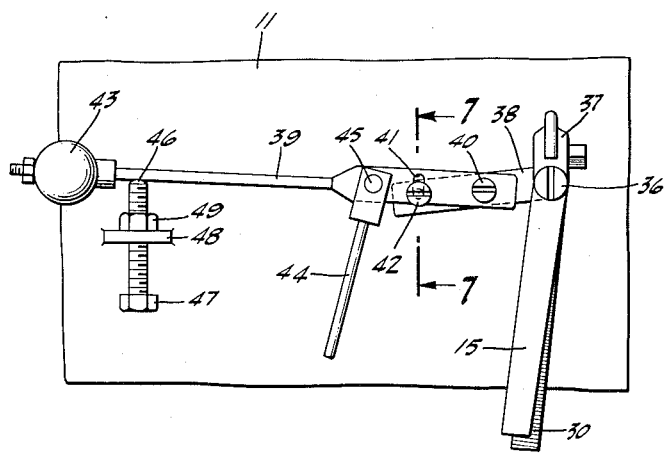
Figure 6 is a front elevation showing a portion of the apparatus on an enlarged scale.
Figure 7:
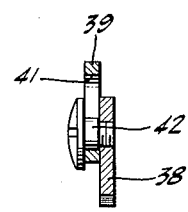
Figure 7 is a sectional detail taken substantially on the lines 7—7 as shown in Figure 6.

Since the pen arms 15 and 30 are exactly the same length and since they swing from the same pivotal axis, the tips thereof would meet in interfering contact near the low end of the range of the chart, if means were not provided to prevent it. As best shown in Figure 1, the crank 38 is fixed to the pen arm 30 and extends laterally from the axis of the shaft 16. An extension element 39 is pivotally connected to the crank 38 by means of the pivot pin 40. A slot 41 is provided in the extension element 39 and a pin 42 fixed to the crank 38 travels within this slot 41. In effect, an angular lost motion connection is thus provided between the crank 38 and the extension element 39. A weight 43 is fixed to the extension element 39 near its swinging end. An actuating rod 44 is pivotally connected to the extension element 39 by means of pivot pin 45. An abutment stop 46 is provided for limiting the counterclockwise movement of the extension element 39 as shown in Figure 6. This abutment stop 46 is provided by means of the adjusting screw 47 which is threaded through a stationary member 48. A lock nut 49 holds the screw 47 in adjusted position. It will be noted that the pivot pin 45 is positioned at a location between the abutment stop 46 and the pivot pin 40. The actuating rod 44 may be connected to a float 50 mounted in a second manometer 51. The two legs of the manometer may be connected in parallel with the legs of the manometer 20. The float 50 therefore moves in the same manner as the float 25.

By reason of the fact that the length of the lever arm represented by the distance between the pivot pin 45 and the shaft 16 is greater than the distance between the pivot pin 28 and the shaft 16, the tip 31 moves at a slower rate than the tip 18. Thus, the graph produced by tip 31 on the chart will represent a greater value than the graph produced by the tip 18. For example, the ratio of levers controlling tips 31 and 18 may be two-to-one, in which case the graph produced by tip 31 is divided by two for correlation with the graph produced by tip 18.

When a relatively high rate of flow of gas passes through the orifice plate 23 the pen arms 15 and 30 take the position shown in Figure 2. The tip 18 is offscale and therefore only the trace left by the tip 31 can be measured. When the rate of flow of gas decreases somewhat, the pen arms 15 and 30 take the position shown in Figure 3. In this position both tips 18 and 31 lie on the calibrated portion of the chart 13 and hence both traces may be read. During the normal operation of the pen arm 30 and its tip 31, the assembly represented by the crank 38 and extension lever or element 39 act as a fixed beam. The weight 43 tends to pivot the extension lever 39 in a counterclockwise direction about the pin 45 holding the pen 42 at the upper extremity of the slot 41. However, as the rate of flow of gas decreases, the tips 18 and 31 approach each other and would meet in interfering contact before the flow rate reached zero. Such contact would produce inaccuracies in the traces of both pen tips.

Figure 4:
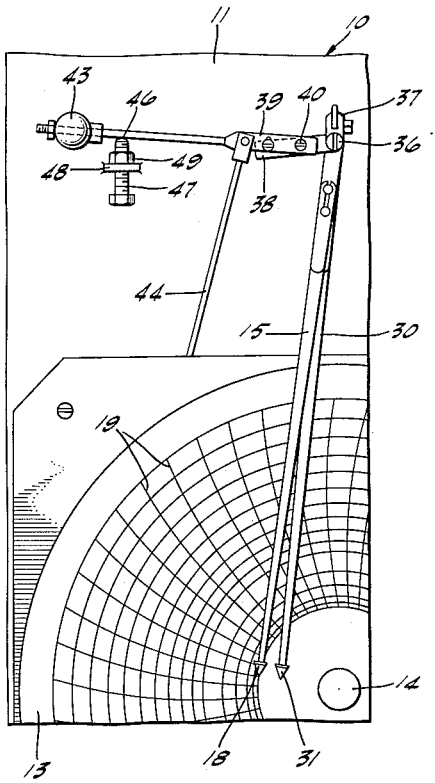

The adjustable stop screw 47 is set so that the stop surface 46 is contacted by the extension element 39 when the slower moving pen tip 31 reaches a pre-determined position on the chart 13, near the inner portion thereof. Continued reduction in the rate of flow of gas causes the arm 44 to move downward and thereby causes the extension lever to fulcrum about the stop surface 46 in a clockwise direction in opposition to the weight 43. This causes relative pivotal movement between the crank 38 and the extension element 39 about the pivot pin 40. This serves to increase the rate of angular movement of the crank 38 with the result that the slower moving pen arm 30 and its tip 31 are thrown out of calibration and move rapidly toward the center of the chart. This condition is shown in Figure 4. For low flow rates therefore only the trace left by the pen tip 18 is considered, and the trace left by the pen tip 31 is disregarded.

Figure 3:
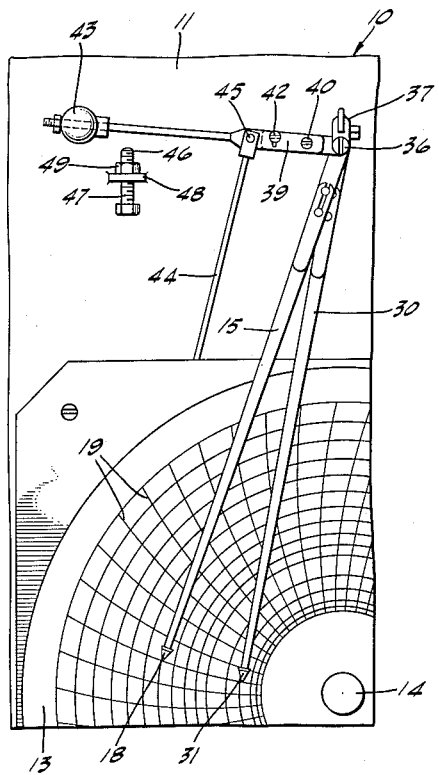
Figures 3 and 4 are views similar to Figure 2 showing pen arms in different operative positions.

When the rate of gas flow increases, the pen tip 18 swings to the left away from the zero calibration, as shown in Figure 4. This motion of the pen tip 18 is greater than even the increased motion of the pen tip 31 so that the tips never reach interfering contact. When the pen tip 31 reaches a pre-determined position relative to the chart 13, such as, for example as shown in Figure 3, the arm 39 moves away from the abutment stop 46 and the pen tip 31 continues its motion to the left in proper calibration.

Having fully described my invention, it is to be understood that I do not wish to be limited to the details herein set forth, but my invention is of the full scope of the appended claims.

I claim:

1. In a recording instrument having a chart, the combination of: a plurality of pen arms of equal length mounted for pivotal movement about a common axis, each arm having a tip adapted to contact the chart, means for simultaneously moving the arms at different rates of angular movement to swing the tips thereof along the same arcuate path of travel, and means acting automatically to change the rate of angular movement of one of the arms when the tip thereof approaches the tip of another arm, to avoid interfering contact.

2. In a recording device of the class described having a calibrated chart, the combination of: two pen arms of equal length mounted for pivotal movement about a common axis, each arm having a tip adapted to contact the chart, motion transmitting means for simultaneously moving the arms at proportional rates of angular movement, said means acting to swing the tips from a zero calibration on the chart along the same arcuate path of travel on the chart, said motion transmitting means including means acting automatically to increase the rate of angular movement of the slower moving arm when the tip thereof approaches the zero calibration of the chart, to avoid interfering contact of said tips.

3. In a recording device of the class described having a chart, the combination of: two pen arms of equal length mounted for pivotal movement about a common axis, each arm having a tip adapted to contact the chart, means for simultaneously moving the arms at proportional rates of angular movement to swing the tips thereof along the same arcuate path of travel, said means including a crank fixed relative to the slower moving arm near said pivotal axis, an extension, means providing an angular lost-motion connection between said crank and extension element, bias means acting on the extension element to swing the crank in one direction, an abutment located for engagement by said extension element, and force applying means connected to the extension element, for moving the crank in the other direction.

4. In a recording device of the class described having a chart, the combination of: two pen arms of equal length mounted for pivotal movement about a common axis, each arm having a tip adapted to contact the chart, means for simultaneously moving the arms at proportional rates of angular movement to swing the tips thereof along the same arcuate path of travel, said means including a crank fixed relative to the slower moving arm near said pivotal axis, an extension element, pivot means connecting said crank and extension element, cooperating parts on the crank and extension element limiting relative movement in one direction, a weight carried on the extension element, an abutment located for engagement by said extension element, and force applying means connected to the extension element at a location between the abutment and said pivot means.

5. An attachment for adding a second pen arm to a single pen arm recording instrument having a chart, comprising in combination: a second pen arm having a length equal to the first pen arm, means for mounting the second pen arm for pivotal movement about the axis of the first pen arm, means for moving the second pen arm at a rate proportional to the rate of angular movement of the first pen arm to swing the tips thereof simultaneously along the same arcuate path of travel, said means including a crank fixed relative to the second pen arm, an extension element, means providing an angular lost-motion connection between said crank and extension element, bias means acting on the extension element to swing the crank in one direction, an abutment located for engagement by said extension element, and force applying means connected to the extension element for moving the crank in the other direction.

6. An attachment for adding a second pen arm to a single pen arm recording instrument having a chart, comprising in combination: a second pen arm having a length equal to the first pen arm, means for mounting the second pen arm for pivotal movement about the axis of the first pen arm, means for moving the second pen arm at a rate proportional to the rate of angular movement of the first pen arm to swing the tips thereof simultaneously along the same arcuate path of travel, said means including a crank fixed relative to the second pen arm, an extension element, pivot means connecting said crank and extension element, cooperating parts on the crank and extension element limiting relative movement in one direction, a weight carried on the extension element, an abutment located for engagement by said extension element, and force applying means connected to the extension element at a location between the abutment and said pivot means.

7. In a recording instrument having a moving chart, the combination of: a pair of pen tips adapted to move in identical paths across said chart; a first drive mechanism adapted to move one of said pen tips at a normally faster rate than the other of said pen tips; a second drive mechanism adapted to move the other of said pen tips at a normally slower rate; and means incorporated in said second drive mechanism operable, on approach of the normally faster moving pen tip to the normally slower moving pen tip, to increase movement of said normally slower pen tip to a speed in excess of said normally faster pen tip and in a direction away from said normally faster pen tip, thereby to avoid interfering contact between said pen tips.

8. In a recording instrument having a moving chart, the combination of: a pair of pen tips adapted to move in identical paths across said chart; a first drive mechanism adapted to move one of said pen tips at a normally faster rate than the other of said pen tips; a second drive mechanism adapted to move the other of said pen tips at a normally slower rate; said pen tips being so arranged that they tend to meet in interfering contact at one margin of said chart; said second drive mechanism having an auxiliary linkage operable as said pen tips approach toward and recede from said interfering contact to maintain said normally slower moving pen tip clear of said normally faster moving pen tip.

References Cited in the file of this patent
UNITED STATES PATENTS

| | | |
|---|---|---|
| 1,869,909 | Norwood | Aug. 2, 1932 |
| 1,980,574 | Chenicek | Nov. 13, 1934 |
| 2,248,429 | Klein et al. | July 8, 1941 |